United States Patent
Mei et al.

(10) Patent No.: US 9,971,527 B2
(45) Date of Patent: May 15, 2018

(54) APPARATUS AND METHOD FOR MANAGING STORAGE FOR PLACING BACKUP DATA INTO DATA BLOCKS BASED ON FREQUENCY INFORMATION

(71) Applicant: FUJITSU LIMITED, Kawasaki-shi, Kanagawa (JP)

(72) Inventors: Shusen Mei, Nagoya (JP); Junichi Mizuno, Toki (JP); Tomoaki Abe, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 14/929,694

(22) Filed: Nov. 2, 2015

(65) Prior Publication Data
US 2016/0179420 A1 Jun. 23, 2016

(30) Foreign Application Priority Data
Dec. 18, 2014 (JP) .................... 2014-256525

(51) Int. Cl.
*G06F 3/06* (2006.01)

(52) U.S. Cl.
CPC .......... *G06F 3/0619* (2013.01); *G06F 3/0604* (2013.01); *G06F 3/065* (2013.01); *G06F 3/0683* (2013.01)

(58) Field of Classification Search
CPC ...... G06F 3/0619; G06F 3/0683; G06F 3/065; G06F 3/0604; G06F 11/2048; G06F 11/2097; G06F 11/2056
See application file for complete search history.

(56) References Cited

U.S. PATENT DOCUMENTS

| | | | |
|---|---|---|---|
| 8,984,027 B1* | 3/2015 | Patwardhan | G06F 17/30079 707/809 |
| 9,459,809 B1* | 10/2016 | Chen | G06F 3/0644 |
| 2003/0163553 A1 | 8/2003 | Kitamura et al. | |
| 2005/0060356 A1* | 3/2005 | Saika | G06F 11/1451 |
| 2007/0239803 A1 | 10/2007 | Mimatsu | |

(Continued)

FOREIGN PATENT DOCUMENTS

| | | |
|---|---|---|
| JP | 2003-248605 | 9/2003 |
| JP | 2007-265403 | 10/2007 |

(Continued)

*Primary Examiner* — Rocio Del Mar Perez-Velez
(74) *Attorney, Agent, or Firm* — Fujitsu Patent Center

(57) ABSTRACT

A storage management apparatus includes an acquiring unit and a control unit. When a first storage apparatus is active and a second storage apparatus is on standby and backup data corresponding to a plurality of data stored in the first storage apparatus are stored in the second storage apparatus, the acquiring unit acquires frequency information from the first storage apparatus, which shows frequency of access from a host apparatus to individual data in the plurality of data. Based on the frequency information, the control unit executes a deciding process that decides in which out of a plurality of storage regions with different access performance provided by the second storage apparatus respective data in the backup data are to be placed, and transmits instruction information to the second storage apparatus, which has the respective backup data placed in the storage regions decided by the deciding process.

3 Claims, 14 Drawing Sheets

(56) References Cited

U.S. PATENT DOCUMENTS

| | | | |
|---|---|---|---|
| 2007/0283090 A1 | 12/2007 | Kaji et al. | |
| 2011/0225379 A1 | 9/2011 | Eguchi et al. | |
| 2014/0032959 A1* | 1/2014 | Dawkins | G06F 11/2048 714/6.3 |
| 2014/0108392 A1* | 4/2014 | Jensen | G06F 3/0613 707/727 |
| 2014/0325121 A1* | 10/2014 | Akutsu | G06F 3/0604 711/103 |
| 2014/0351515 A1* | 11/2014 | Chiu | G06F 3/0605 711/117 |

FOREIGN PATENT DOCUMENTS

| | | |
|---|---|---|
| JP | 2007-328468 | 12/2007 |
| WO | 2011/111093 | 9/2011 |

* cited by examiner

APPARATUS AND METHOD FOR MANAGING STORAGE FOR PLACING BACKUP DATA INTO DATA BLOCKS BASED ON FREQUENCY INFORMATION

CROSS-REFERENCE TO RELATED APPLICATION

This application is based upon and claims the benefit of priority of the prior Japanese Patent Application No. 2014-256525, filed on Dec. 18, 2014, the entire contents of which are incorporated herein by reference.

FIELD

The present embodiments discussed herein are related to an apparatus and method for managing storage.

BACKGROUND

A known technology arranges storage devices in a storage apparatus into a hierarchy according to response performance for accesses and relocates data between levels in the hierarchy. As one example, data that is accessed frequently is placed in high-performance storage devices and data that is accessed infrequently is placed in low-performance storage devices. By arranging data in this way, high-speed access is possible.

One proposed technology for arranging storage devices into a hierarchy is described below. As one example, storage regions that form the volumes of a main and a standby storage system are arranged into respective hierarchies. During a failover, the volume of the standby storage system is migrated to levels in the standby storage system that correspond to the levels of the volume of the main storage system.

In another proposed technology, a primary page and a secondary page with the same data content are stored on a solid state drive (SSD) and the secondary page is moved to a serial ATA (SATA) disk that has a lower cost than the SSD when a pair suspend command has been received.

With yet another proposed technology, when data is copied remotely, a storage apparatus at the copy destination copies data into a storage device that is provided within the storage apparatus and corresponds to the storage level at the copy source.

See, for example, the following documents:
Japanese Laid-Open Patent Publication No. 2007-328468;
International Publication Pamphlet No. WO2011-111093; and
Japanese Laid-Open Patent Publication No. 2007-265403.

In some storage systems with redundant storage apparatuses, data stored in the storage apparatus currently in use (i.e., active) is backed up in a storage apparatus currently on standby. In addition to such backup function, it would also be conceivably possible to arrange the storage devices in the respective storage apparatuses into hierarchies and to relocate data between the levels in the hierarchies. In such a situation, data is relocated in the active storage apparatus in accordance with how frequently the data is accessed from a host apparatus. On the other hand, at the standby storage apparatus, since accesses from a host apparatus are not received, data transmitted from the active storage apparatus for backup purposes ends up being placed on any level in the hierarchy regardless of how frequently the data is accessed from the host apparatus. If a failover occurs in this state, there is a problem that the improvement in access speed produced by arranging the storage regions into a hierarchy is no longer obtained when a storage apparatus that has switched from the standby state to the active state receives accesses from a host apparatus.

SUMMARY

According to one aspect there is provided a storage management apparatus including a processor performing a procedure including: acquiring, in a state where out of a first storage apparatus and a second storage apparatus capable of receiving access from a host apparatus, the first storage apparatus is active and the second storage apparatus is on standby and a plurality of backup data respectively corresponding to a plurality of data stored in the first storage apparatus are stored in the second storage apparatus, frequency information from the first storage apparatus, the frequency information indicating frequency of access from the host apparatus to individual data in the plurality of data; executing a deciding process that decides, based on the frequency information, in which of a plurality of storage regions with different access performance provided by the second storage apparatus respective backup data in the plurality of backup data are to be placed; and transmitting instruction information to the second storage apparatus, the instruction information indicating that the respective backup data are to be placed in the storage regions decided by the deciding process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
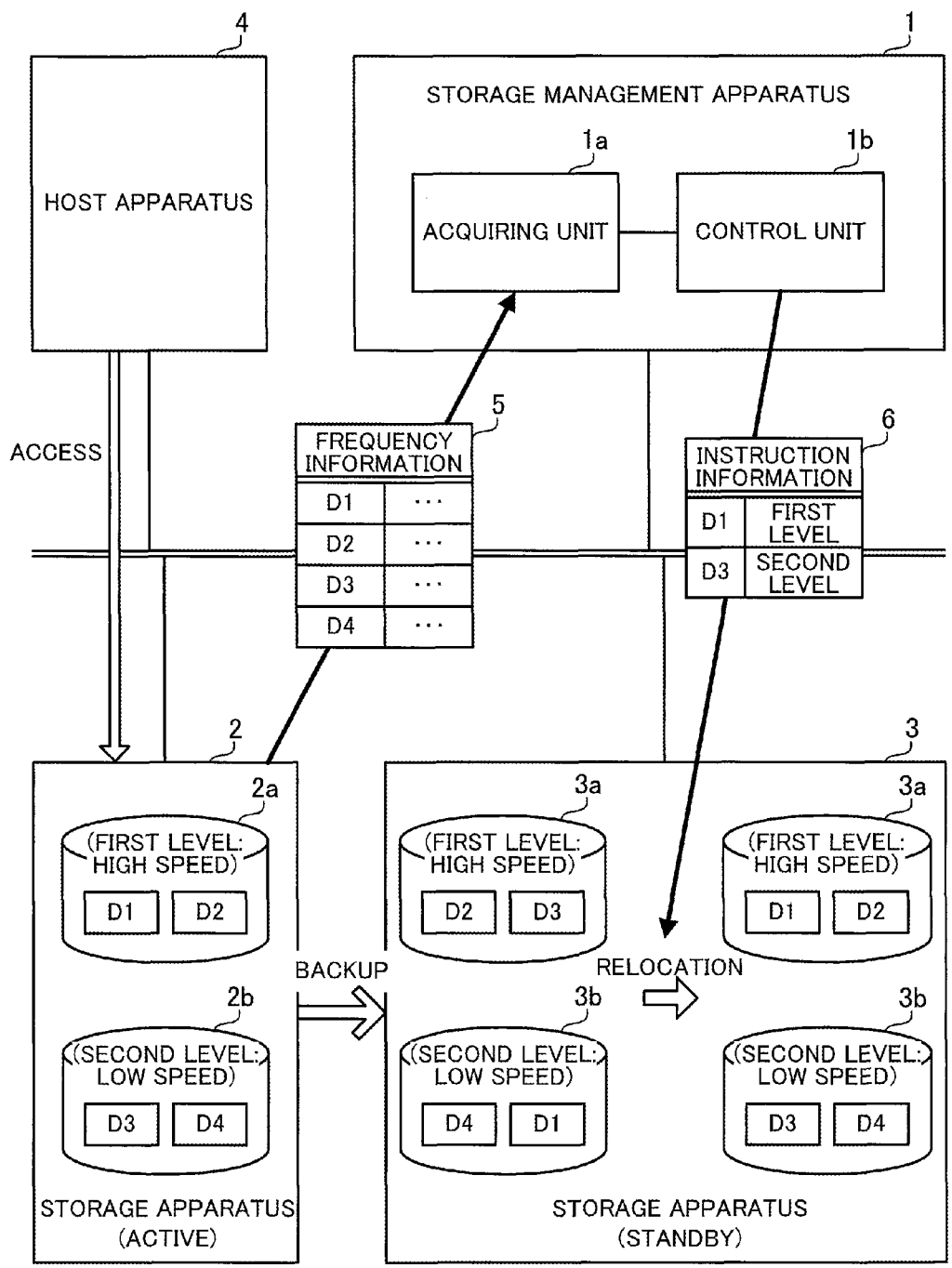
FIG. 1 depicts a storage system according to a first embodiment.

Several embodiments will be described below with reference to the accompanying drawings, wherein like reference numerals refer to like elements throughout.

First Embodiment

FIG. 1 depicts a storage system according to a first embodiment. The storage system includes a storage management apparatus 1, storage apparatuses 2 and 3, and a host apparatus 4. The storage management apparatus 1, the storage apparatuses 2 and 3, and the host apparatus 4 are connected via a network.

The storage apparatuses 2 and 3 are both apparatuses with a plurality of storage devices for storing data, and are capable of receiving accesses from the host apparatus 4 to data stored in the plurality of storage devices. When one storage apparatus out of the storage apparatuses 2 and 3 is active, the other apparatus is placed on standby, and data stored in the active storage apparatus is backed up in the standby storage apparatus. As one example, when data stored in the active storage apparatus is updated in accordance with a write request from the host apparatus 4, the updated content is immediately reflected in the data stored in the standby storage apparatus. When the operation of the active storage apparatus has stopped, such as when a problem has occurred, a failover is performed and the other storage apparatus that was on standby is set as active so as to take over the receiving of accesses from the host apparatus 4.

The host apparatus 4 accesses data stored in the active storage apparatus out of the storage apparatuses 2 and 3.

The storage management apparatus 1 manages how data is placed in storage regions, for at least the data stored in the standby storage apparatus out of the storage apparatuses 2 and 3.

In the example described below, the storage apparatus 2 is active and the storage apparatus 3 is on standby. It is also assumed that data D1 to D4 is stored in the storage apparatus 2 and that the data D1 to D4 is backed up in the storage apparatus 3.

The standby storage apparatus 3 provides a plurality of storage regions with different access performance. In the present embodiment, the storage apparatus 3 has a first-level storage region 3a and a second-level storage region 3b as examples of such storage regions. It is assumed that the access speed of the first-level storage region 3a is higher than the access speed of the second-level storage region 3b. That is, the access speed of the one or more storage devices that realize the first-level storage region 3a is higher than the access speed of the one or more storage devices that realize the second-level storage region 3b.

The data D1 to D4 backed up in the storage apparatus 3 is placed in one of the first-level storage region 3a and the second-level storage region 3b. The storage apparatus 3 is also capable of "relocation" where the storage regions in which the data D1 to D4 are placed are changed based on instructions from the storage management apparatus 1.

The storage management apparatus 1 includes an acquiring unit 1a and a control unit 1b. The processing of the acquiring unit 1a and the control unit 1b is realized for example by a processor included in the storage management apparatus 1 executing a predetermined program.

The acquiring unit 1a acquires frequency information 5 from the storage apparatus 2, which indicates the frequency of access from the host apparatus 4 to the respective data D1 to D4 stored in the storage apparatus 2. The frequency information 5 is measured by the storage apparatus 2.

Based on the acquired frequency information 5, the control unit 1b executes a deciding process that decides into which of the first-level storage region 3a and the second-level storage region 3b the data D1 to D4 backed up in the storage apparatus 3 are to be placed. In this deciding process, the higher the access frequency of data at the storage apparatus 2, the higher the level (i.e., the higher the access speed) of the storage region in which the data is placed. The control unit 1b transmits instruction information 6 to the storage apparatus 3, which indicates which of the first-level storage region 3a and the second-level storage region 3b has been selected by the deciding process described above for placing each of the data D1 to D4.

As one example, it is assumed that before the instruction information 6 is transmitted, in the storage apparatus 3, the data D2 and D3 are placed in the first-level storage region 3a and the data D1 and D4 are placed in the second-level storage region 3b. It is assumed that the storage region in which data is to be placed is decided based on the result of comparing the access frequency with a predetermined threshold. It is also assumed that in the frequency information 5, the access frequencies of the data D1 and D2 are equal to or above the threshold and the access frequencies of the data D3 and D4 are below the threshold.

In this example scenario, the control unit 1b decides to place the data D1 and D2 in the first-level storage region 3a and to place the data D3 and D4 in the second-level storage region 3b. The control unit 1b then transmits instruction information 6, which for example instructs the storage apparatus 3 that the location of the data D1 is to change to the first-level storage region 3a and that the location of the data D3 is to change to the second-level storage region 3b. Note that information indicating the storage regions that are the locations of all of the data backed up in the storage apparatus 3 may be associated with the instruction information 6.

Based on the received instruction information 6, the storage apparatus 3 moves the data D1 from the second-level storage region 3b to the first-level storage region 3a and moves the data D3 from the first-level storage region 3a to the second-level storage region 3b.

At this time, the storage apparatus 3 is on standby and does not receive accesses from the host apparatus 4. This means that it is not possible for the storage management apparatus 1 to relocate the backed up data D1 to D4 to appropriate storage regions in accordance with the access frequency from the host apparatus 4 based on information acquired from the storage apparatus 3 itself. Accordingly, the data D1 to D4 would normally each remain placed in one of the first-level storage region 3a and the second-level storage region 3b regardless of the access frequency. However, as a result of the processing described above of the storage management apparatus 1, the data D1 to D4 backed up in the standby storage apparatus 3 is placed in appropriate storage regions in accordance with how often the data is accessed by the host apparatus 4 at the active storage apparatus 2. Accordingly, when a failover is performed and the storage apparatus 3 that has become active from the standby state receives accesses from the host apparatus 4, the speed of response to such accesses is improved.

As one example, the storage apparatus 2 may be equipped with a first-level storage region 2a with similar access performance to the first-level storage region 3a and a second-level storage region 2b with similar access performance to the second-level storage region 3b. In the same way as for the data D1 to D4 in the storage apparatus 3, the control unit 1b may also instruct the storage apparatus 2 to relocate the data D1 to D4 in the storage apparatus 2 to appropriate storage regions based on the frequency information 5.

By relocating data in the storage apparatus 2, the response performance of the storage apparatus 2 to accesses from the host apparatus 4 is improved. A further benefit is that when a failover is performed and the storage apparatus 3 that has become active from the standby state is accessed from the host apparatus 4, there is less risk of a drop in the response speed to accesses compared to before the failover.

Second Embodiment

Figure 2:
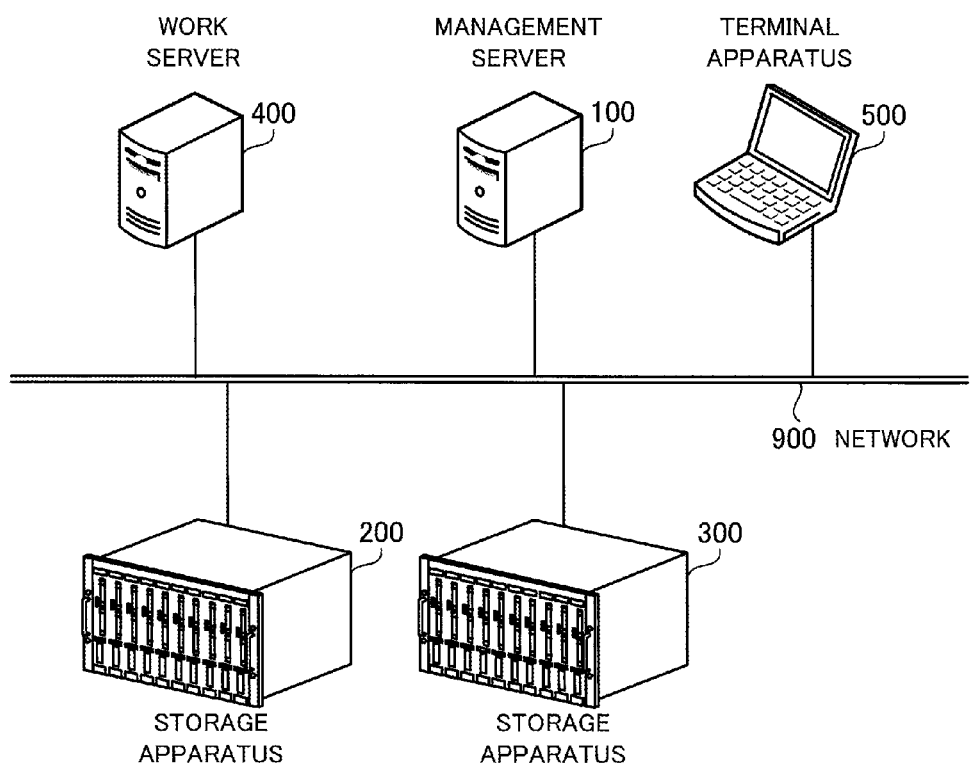
FIG. 2 depicts a storage system according to a second embodiment.

FIG. 2 depicts a storage system according to a second embodiment. The storage system includes a management server 100, storage apparatuses 200 and 300, a work server 400, and a terminal apparatus 500. The management server 100, the storage apparatuses 200 and 300, the work server 400, and the terminal apparatus 500 are connected via a network 900. The network 900 may be a local area network (LAN) or a wide area network (WAN) such as the Internet. However, the storage apparatuses 200 and 300 and the work server 400 communicate via a storage area network (SAN).

Note that the management server 100 is one example of the storage management apparatus 1 depicted in FIG. 1, the storage apparatus 200 is one example of the storage apparatus 2 in FIG. 1, and the storage apparatus 300 is one example of the storage apparatus 3 in FIG. 1.

The management server 100 is a server computer that manages the operation of the storage apparatuses 200 and 300. As one example, the management server 100 performs hierarchical control of the storage apparatuses 200 and 300. Here, the expression "hierarchical control" refers to control that has data to be stored in a storage apparatus placed in an appropriate storage region, out of a plurality of storage regions realized by storage devices with different access performance, in keeping with the access frequency to the data.

The storage apparatus 200 controls access from the work server 400 to a logical volume defined inside the storage apparatus 200. In the same way, the storage apparatus 300 controls access from the work server 400 to a logical volume defined inside the storage apparatus 300.

When one out of the storage apparatuses 200 and 300 is active, the other is placed on standby, with the active storage apparatus receiving accesses from the work server 400. The active storage apparatus also backs up data stored in the logical volume inside the active storage apparatus in the standby storage apparatus. When the standby storage apparatus becomes active due to a failover occurring, the newly active storage apparatus receives accesses from the work server 400 to the logical volume that stores the backup data. By doing so, even if a storage apparatus has stopped operating, such as when a problem has occurred, it is possible for work at the work server 400 to continue by using the other storage apparatus.

Note that in the present embodiment, it is assumed that the storage apparatus 200 is primary storage while the storage apparatus 300 is secondary storage, and that at the start of operation, the storage apparatus 200 is active and the storage apparatus 300 is on standby.

The work server 400 is a server computer that carries out processing related to various tasks. The work server 400 accesses a logical volume defined in whichever of the storage apparatuses 200 and 300 is active.

The terminal apparatus 500 is a client computer used by the manager of the storage system. As one example, by operating the terminal apparatus 500, the manager sets the management server 100 to periodically carry out hierarchical control of the storage apparatuses 200 and 300.

Figure 3:
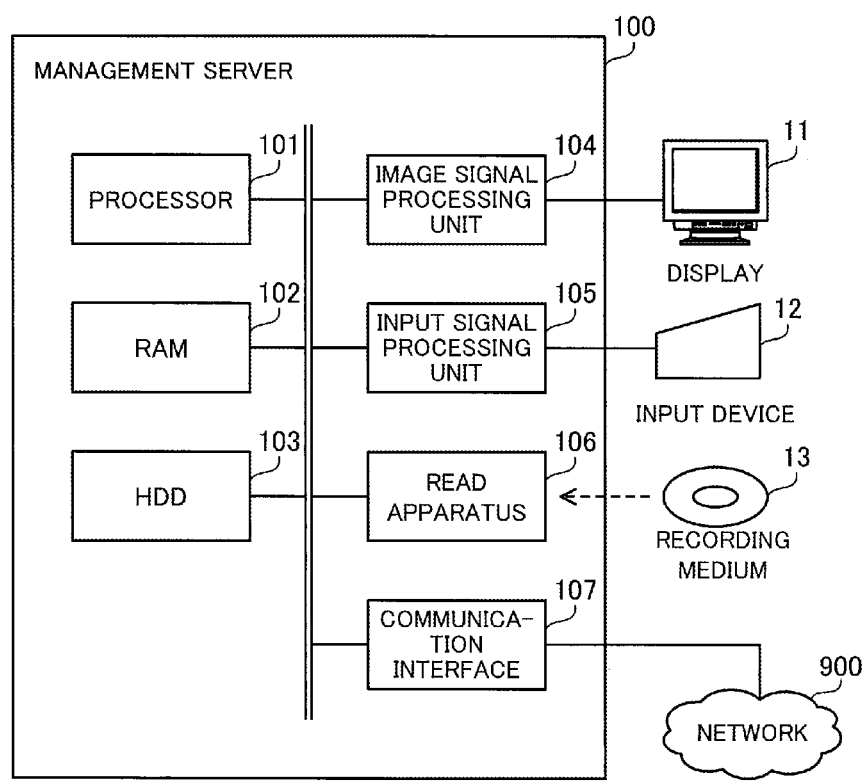
FIG. 3 depicts example hardware of a management server.

FIG. 3 depicts example hardware of the management server 100. The management server 100 includes a processor 101, a RAM 102, a hard disk drive (HDD) 103, an image signal processing unit 104, an input signal processing unit 105, a read apparatus 106, and a communication interface 107.

The processor 101 may be a multiprocessor. As examples, the processor 101 is a central processing unit (CPU), a digital signal processor (DSP), an application-specific integrated circuit (ASIC) or a field-programmable gate array (FPGA). Alternatively, the processor 101 may be a combination of two or more of a CPU, a DSP, an ASIC, an FPGA, and the like.

The RAM 102 is the main storage of the management server 100. The RAM 102 temporarily stores at least part of an operating system (OS) program and an application program to be executed by the processor 101. The RAM 102 also stores various data used in processing by the processor 101.

The hard disk drive (HDD) 103 is auxiliary storage of the management server 100. The HDD 103 magnetically reads and writes data from and onto internally housed magnetic disks. OS programs, application programs, and various data are stored in the HDD 103. The management server 100 may be equipped with another type of auxiliary storage, such as flash memory or a solid state drive (SSD), or may be equipped with a plurality of auxiliary storage apparatuses.

The image signal processing unit 104 outputs images to a display 11 connected to the management server 100 in accordance with instructions from the processor 101. As the display 11, it is possible to use a cathode ray tube (CRT) display, a liquid crystal display, or the like.

The input signal processing unit 105 acquires an input signal from an input device 12 connected to the management server 100 and outputs to the processor 101. As examples of the input device 12, it is possible to use a pointing device, such as a mouse or a touch panel, or a keyboard.

The read apparatus 106 reads programs and data recorded on a recording medium 13. As examples of the recording medium 13, it is possible to use a magnetic disk such as a flexible disk or an HDD, an optical disc such as a compact disc (CD) or a digital versatile disc (DVD), or a magneto-optical (MO) disk. As another example, it is also possible to use a nonvolatile semiconductor memory such as a flash memory card as the recording medium 13. In accordance with an instruction from the processor 101, for example, the read apparatus 106 stores a program or data read from the recording medium 13 in the RAM 102 or the HDD 103. In addition, the processor 101 is capable of instructing the management server 100 to store programs and data read from the recording medium 13 in the RAM 102 or the HDD 103 of the management server 100.

The communication interface 107 communicates with the storage apparatuses 200 and 300 and the terminal apparatus 500 via the network 900.

Note that the work server 400 and the terminal apparatus 500 can also be realized by similar hardware to the management server 100.

Figure 4:
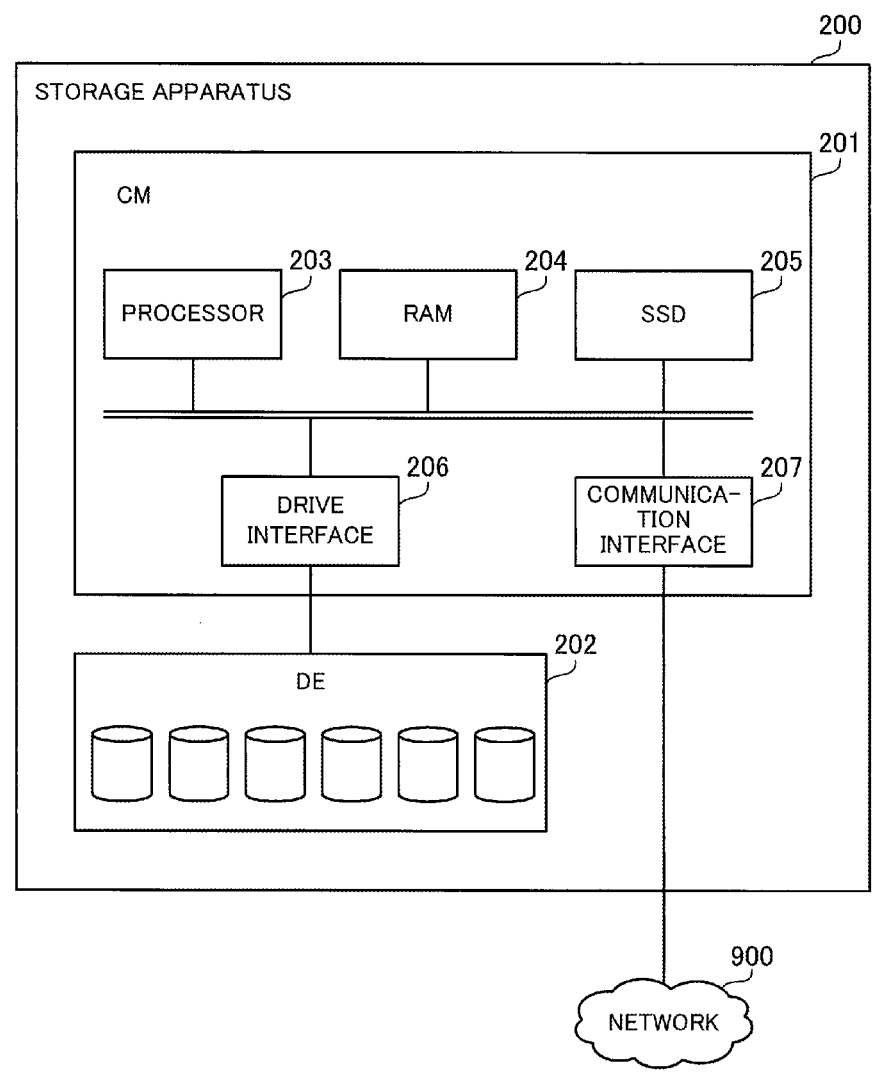
FIG. 4 depicts example hardware of a storage apparatus.

FIG. 4 depicts example hardware of a storage apparatus. The storage apparatus 200 includes a controller module (CM) 201 and a drive enclosure (DE) 202. Note that the storage apparatus 200 may include a plurality of controller modules and may include two or more drive enclosures.

The drive enclosure 202 includes a plurality of storage devices that store data to be accessed from the work server 400. Various types of storage devices with different access performance are mounted in the drive enclosure 202. As one example, in descending order of access performance, an SSD, an HDD as "online storage", and an HDD as "nearline storage" are mounted in the drive enclosure 202. One or more devices of the respective types are mounted in the drive enclosure 202.

The controller module 201 accesses the storage devices inside the drive enclosure 202 in accordance with access requests from the work server 400. The controller module 201 is also capable of operating in accordance with instructions from the management server 100. As one example, the controller module 201 relocates data included in a logical volume from a storage device inside the drive enclosure 202 to a different storage device in accordance with an instruction from the management server 100.

The controller module 201 includes a processor 203, a RAM 204, an SSD 205, a drive interface 206, and a communication interface 207. Such components are connected by a bus.

The processor 203 controls processing by the controller module 201. As examples, the processor 203 is a CPU, a DSP, an ASIC, or an FPGA. The processor 203 may be a multiprocessor. The processor 203 may be a combination of two or more of a CPU, a DSP, an ASIC, an FPGA, and the like.

The RAM 204 is the main storage of the controller module 201. The RAM 204 temporarily stores at least part of an OS (operating system) program and an application program to be executed by the processor 203. The RAM 204 also stores various data used in processing by the processor 203.

The SSD 205 is auxiliary storage of the controller module 201. OS programs, application programs, and various data are stored in the SSD 205. Note that the controller module 201 may be equipped with an HDD in place of the SSD 205 as auxiliary storage.

The drive interface 206 is an interface for communicating with the storage devices inside the drive enclosure 202. The communication interface 207 is an interface for communication via the network 900 with the management server 100, the storage apparatus 300, and the work server 400 (FIG. 2). Note that in reality, a communication interface that connects via a LAN or the like to the management server 100 and a communication interface that connects via a SAN or the like to the work server 400 are separately provided.

Note that the storage apparatus 300 may also be realized by similar hardware to the storage apparatus 200. That is, the storage apparatus 300 includes a controller module and a drive enclosure, and the drive enclosure of the storage apparatus 300 includes a plurality of storage devices. Various types of storage device with different access performance are mounted in the drive enclosure of the storage apparatus 300, with one or more devices of each type of storage device being provided.

In the following description, when the storage apparatus 200 is referred to as being "active" or "on standby", this refers to the controller module 201 inside the storage apparatus 200 being active or on standby. In the same way, when the storage apparatus 300 is referred to as being "active" or "on standby", this refers to the controller module inside the storage apparatus 300 being active or on standby.

Figure 5:
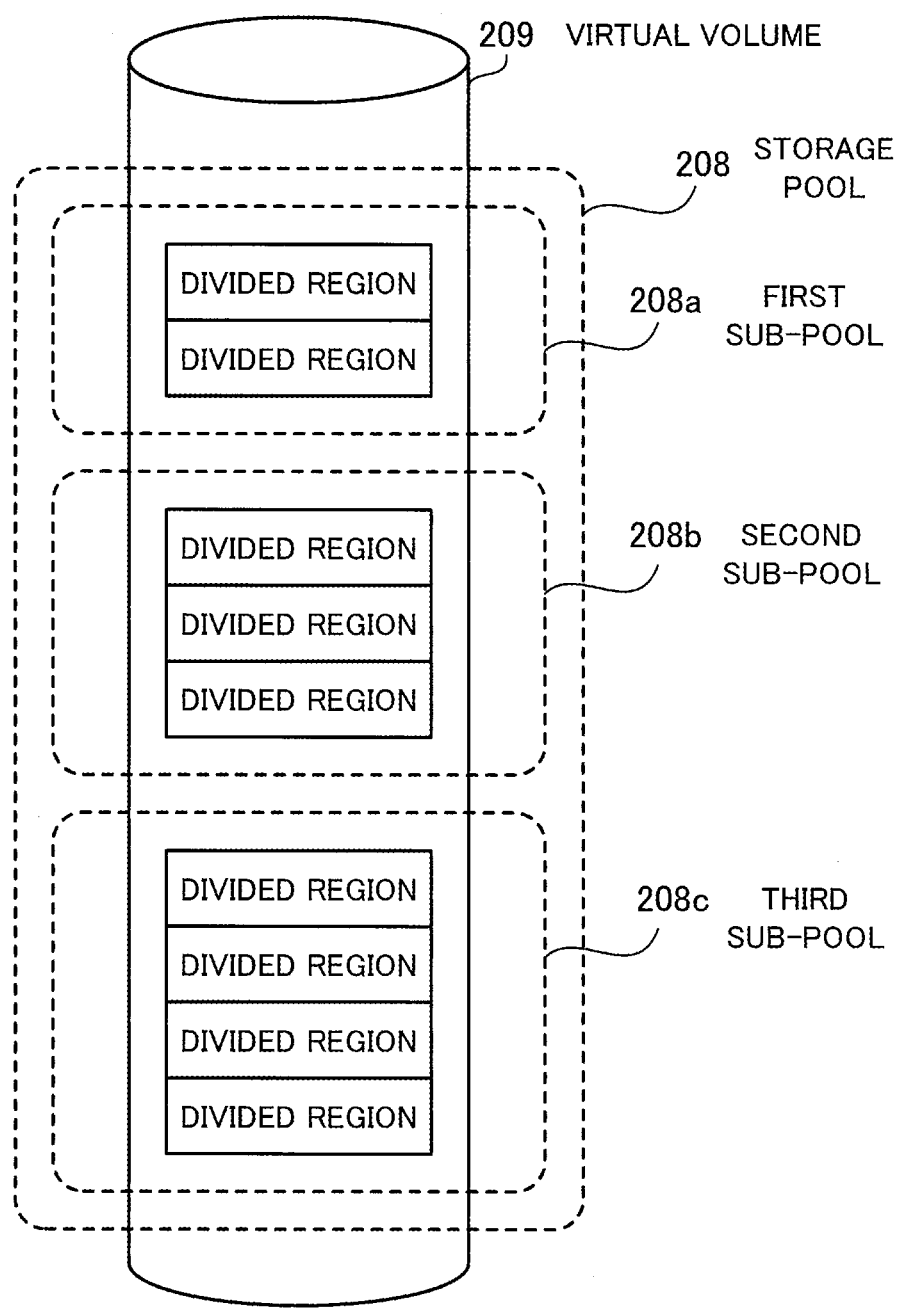
FIG. 5 depicts hierarchical control of storage regions.

FIG. 5 depicts hierarchical control of storage regions. A storage pool 208 is set in the storage apparatus 200. The storage pool 208 is a storage region assigned as a physical region to a logical volume defined in the storage apparatus 200 and is realized by the storage devices in the drive enclosure 202.

The storage region 208 is divided into a first sub-pool 208a, a second sub-pool 208b, and a third sub-pool 208c. The first sub-pool 208a is realized by one or more storage devices with the same access performance. The second sub-pool 208b is realized by one or more storage devices with the same access performance that is lower than the access performance of the storage devices that realize the first sub-pool 208a. The third sub-pool 208c is realized by one or more storage devices with the same access performance that is lower than the access performance of the storage devices that realize the second sub-pool 208b. With this configuration, the storage pool 208 is divided into a hierarchy of three storage regions according to access performance.

Note that as one example, one sub-pool is defined as one or more RAID (Redundant Arrays of Inexpensive Disks) groups composed of storage apparatuses of the same access performance.

A virtual volume 209 is also set in the storage apparatus 200 as a logical volume to be accessed from the work server 400. As described later, the virtual volume 209 is associated with a virtual volume inside the storage apparatus 300, with data in one virtual volume being backed up in the other virtual volume.

The virtual volume 209 is managed with divided regions of a certain size (for example, 21 MB) as units, and physical regions that individually correspond to the divided regions are assigned to any of the regions in the storage pool 208. In the present embodiment, out of the divided regions of the virtual volume 209, only divided regions in which data is stored are assigned to the storage pool 208. By doing so, the storage regions provided by the storage devices in the drive enclosure 202 are used efficiently.

Here, the respective divided regions in the virtual volume 209 are assigned to one of the first sub-pool 208a, the second sub-pool 208b, and the third sub-pool 208c. The management server 100 controls the assigning of the divided regions in the virtual volume 209 so that divided regions that are accessed most frequently from the work server 400 are assigned to sub-pools realized by storage devices with the highest access performance. As one example, when the access frequency to a divided region has decreased, the divided region is reassigned to a sub-pool realized by storage devices with lower access performance. In this case, in accordance with an instruction from the management server 100, the storage apparatus 200 relocates the data stored in the divided region from storage devices corresponding to the sub-pool before reassignment to storage devices corresponding to the sub-pool after reassignment.

Due to such hierarchical control, the higher the access frequency to data from the work server 400, the higher the response speed to access requests from the work server 400. As a result, the overall response performance for access requests from the work server 400 is improved.

Note that hierarchical control of the storage apparatus 200 described above is carried out when the storage apparatus 200 is active. Although hierarchical control of the storage apparatus 200 has been described with reference to FIG. 5, when the storage apparatus 300 is active, similar hierarchical control is carried out for the storage apparatus 300.

Figure 6:
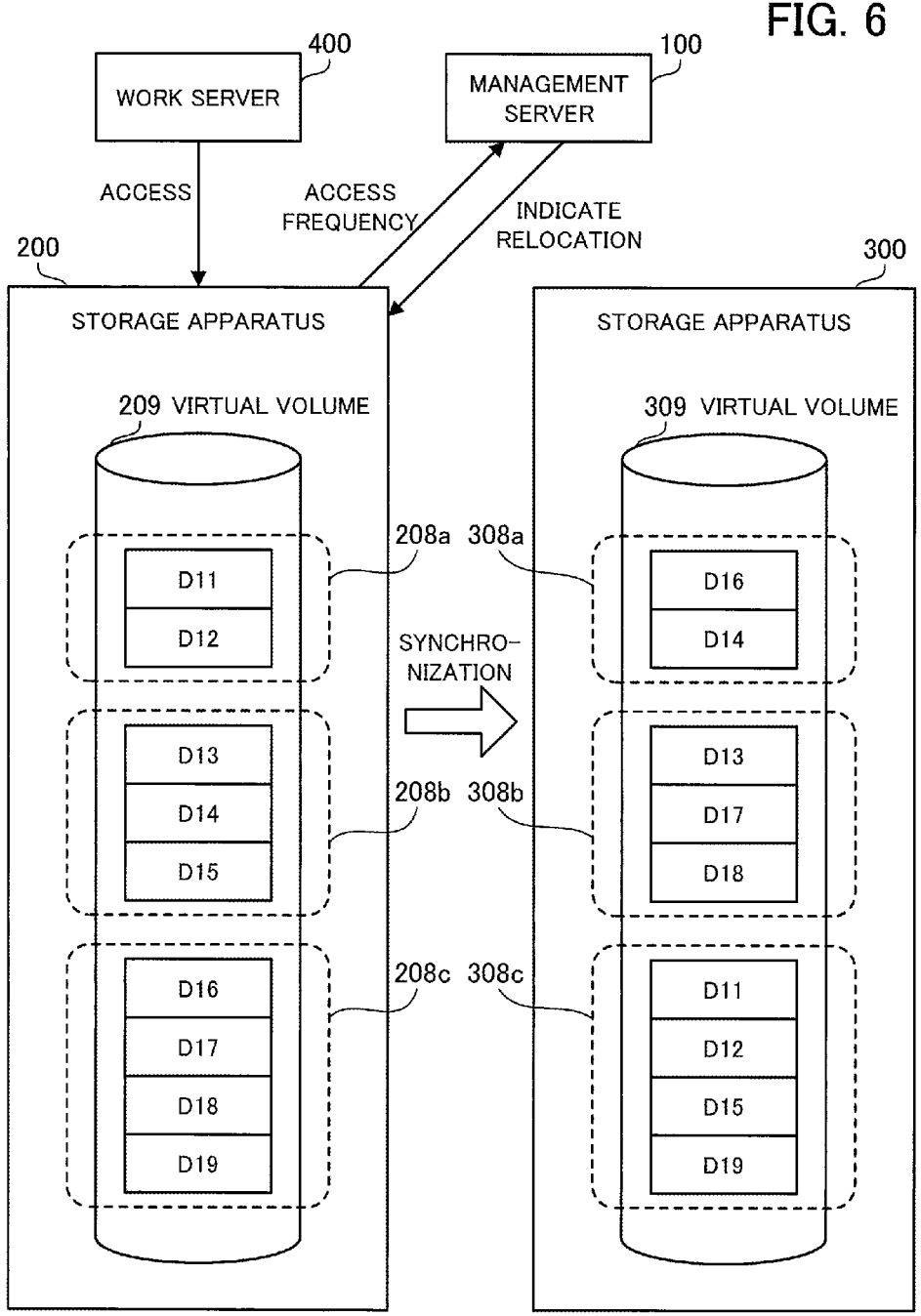
FIG. 6 depicts a comparative example of a relocation process.

FIG. 6 depicts a comparative example of a relocation process. Note that FIG. 6 has a premise that a comparative example of processing has been executed for the storage apparatuses 200 and 300.

In the same way as the example in FIG. 5, the first sub-pool 208a, the second sub-pool 208b, and the third sub-pool 208c are set in the storage apparatus 200. The virtual volume 209 is also defined in the storage apparatus 200 and out of the divided regions of the virtual volume 209, divided regions in which data is stored are assigned to one of the first sub-pool 208a, the second sub-pool 208b, and the third sub-pool 208c.

When the storage apparatus 200 is active, under the control of the management server 100, the divided regions of the virtual volume 209 are assigned to appropriate sub-pools in accordance with the frequency of access from the work server 400 to such divided regions. As one example, the management server 100 acquires the frequency of access by the work server 400 to data in each divided region of the virtual volume 209 from the storage apparatus 200. The management server 100 determines an appropriate sub-pool to be assigned to each divided region based on the acquired access frequency of each divided region. When there is a divided region to be reassigned, the management server 100 notifies the storage apparatus 200 of the new sub-pool to which the divided region is to be assigned and indicates that the data in the divided region is to be relocated in the newly assigned sub-pool.

In the example in FIG. 6, data D11 to D19, which are stored in respectively different divided regions, are included in the virtual volume 209. The data D11 and D12 are placed in the first sub-pool 208a, the data D13 to D15 are placed in the second sub-pool 208b, and the data D16 to D19 are placed in the third sub-pool 208c. Here, the data D11 and D12 are data with a high access frequency, the data D13 to D15 are data with an intermediate access frequency, and the data D16 to D19 are data with a low access frequency.

A virtual volume 309 of the same size as the virtual volume 209 is defined in the standby storage apparatus 300 and the data in the virtual volume 209 is backed up in the virtual volume 309. When data in the virtual volume 209 is updated by a write request from the work server 400, the data after updating is transmitted from the storage apparatus 200 to the storage apparatus 300 and the updated content is immediately reflected in the virtual volume 309. By doing so, the virtual volume 209 and the virtual volume 309 are synchronized.

A first sub-pool 308a, a second sub-pool 308b, and a third sub-pool 308c are also defined in the storage apparatus 300. The first sub-pool 308a is realized by storage devices with the same access performance as the first sub-pool 208a, the second sub-pool 308b is realized by storage devices with the same access performance as the second sub-pool 208b, and the third sub-pool 308c is realized by storage devices with the same access performance as the third sub-pool 208c. Divided regions in which data is stored out of the divided regions of the virtual volume 309 are assigned to one of the first sub-pool 308a, the second sub-pool 308b, and the third sub-pool 308c.

Since the standby storage apparatus 300 is not accessed from the work server 400, it is not possible for the management server 100 to carry out hierarchical control of the standby storage apparatus 300 in accordance with the frequency of access from the work server 400. For this reason, data transmitted from the virtual volume 209 to the storage apparatus 300 for backup purposes is placed in any of the sub-pools in the storage apparatus 300 regardless of the access frequency. As one example, data in the respective divided regions of the virtual volume 309 is placed in sub-pools that are decided in advance for the corresponding divided regions. As a result, as depicted in the example in FIG. 6, the same data may be placed in sub-pools on different levels at the storage apparatus 200 and the storage apparatus 300.

With the data placed as described above, assume that a failover has occurred due to a problem or the like occurring at the storage apparatus 200. The storage apparatus 300 becomes active and accesses to the virtual volume 309 are received from the work server 400. However, as described above, the data in the virtual volume 309 has been placed in any of the sub-pools regardless of the access frequency from the work server 400. This means that there is the risk that the response speed for access requests from the work server 400 to the virtual volume 309 will be slower than the response speed for access requests to the virtual volume 209.

Figure 7:
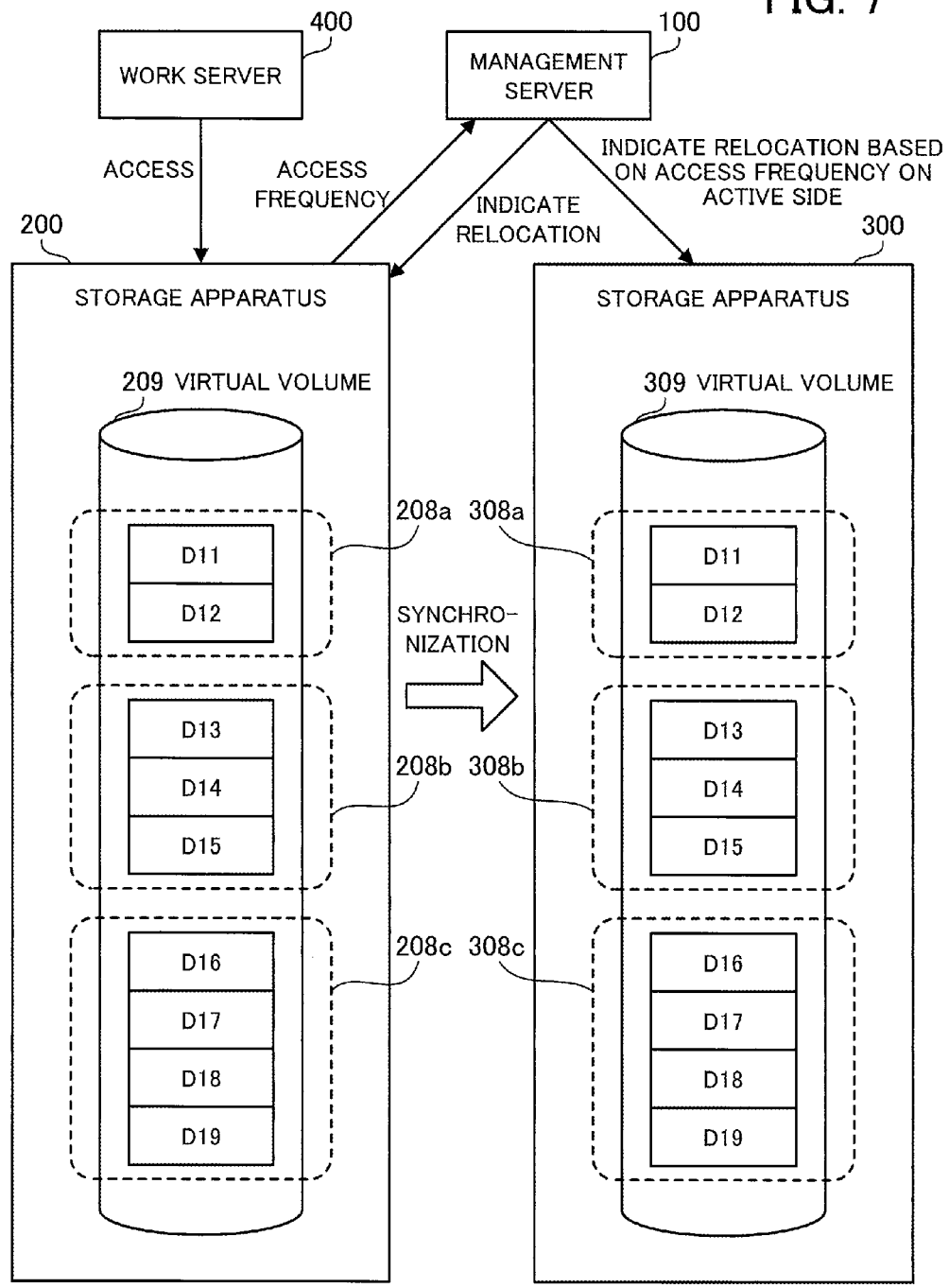
FIG. 7 depicts an example of a relocation process according to the second embodiment.

To avoid the problem, in this second embodiment, the management server 100 carries out control as depicted in FIG. 7.

FIG. 7 depicts an example of relocation according to the second embodiment. In the same way as FIG. 6, the first sub-pool 208a, the second sub-pool 208b, and the third sub-pool 208c are set in the storage apparatus 200. The virtual volume 209 is also defined in the storage apparatus 200 and divided regions in which data is stored out of the divided regions of the virtual volume 209 are assigned to any of the first sub-pool 208a, the second sub-pool 208b, and the third sub-pool 208c. Also, in the same way as FIG. 6, the first sub-pool 308a, the second sub-pool 308b, and the third sub-pool 308c are set in the storage apparatus 300. The virtual volume 309 is defined in the storage apparatus 300 and divided regions in which data is stored out of the divided regions of the virtual volume 309 are assigned to any of the first sub-pool 308a, the second sub-pool 308b, and the third sub-pool 308c.

The following description starts with the storage apparatus 200 in the active state where the storage apparatus 200 receives accesses to the virtual volume 209 from the work server 400 and data in the virtual volume 209 is backed up in the virtual volume 309.

In the present embodiment, the management server 100 acquires, from the active storage apparatus 200, the frequency of access from the work server 400 to the respective divided regions of the virtual volume 209. Based on the acquired access frequency, the management server 100 indicates not only appropriate locations for data in the active storage apparatus 200 but also appropriate relocation destinations for data in the standby storage apparatus 300. By doing so, the same data is placed in sub-pools on the same level in the storage apparatuses 200 and 300. As a result, it is possible to avoid a drop in response performance for access requests from the work server 400 when a failover is performed and the storage apparatus 300 becomes active.

Note that the virtual volume 209 may include a plurality of logical volumes that are accessed from the work server 400 and the virtual volume 309 may include the same number of logical volumes as the virtual volume 209. In this case, the logical volumes in the virtual volume 209 and the logical volumes in the virtual volume 309 form pairs that are synchronized. Out of the paired logical volumes, data in the logical volume defined in the active storage apparatus is backed up in the other logical volume. When a plurality of logical volumes are included in the virtual volume, it is possible to perform hierarchical control with the plurality of logical volumes included in the virtual volume as units.

Next, the processing of the storage system will be described in detail. Note that to clarify the description, an address in a virtual volume is referred to as a "logical address", while an address in a sub-pool is referred to as a "physical address". It is also assumed in the following description that IOPS (Input Output Per Second) is used as information indicating the access frequency from the work server 400 to data in a divided region of a virtual volume.

IOPS is measured for each divided region in the active storage apparatus and is reported to the management server 100.

Figure 8:
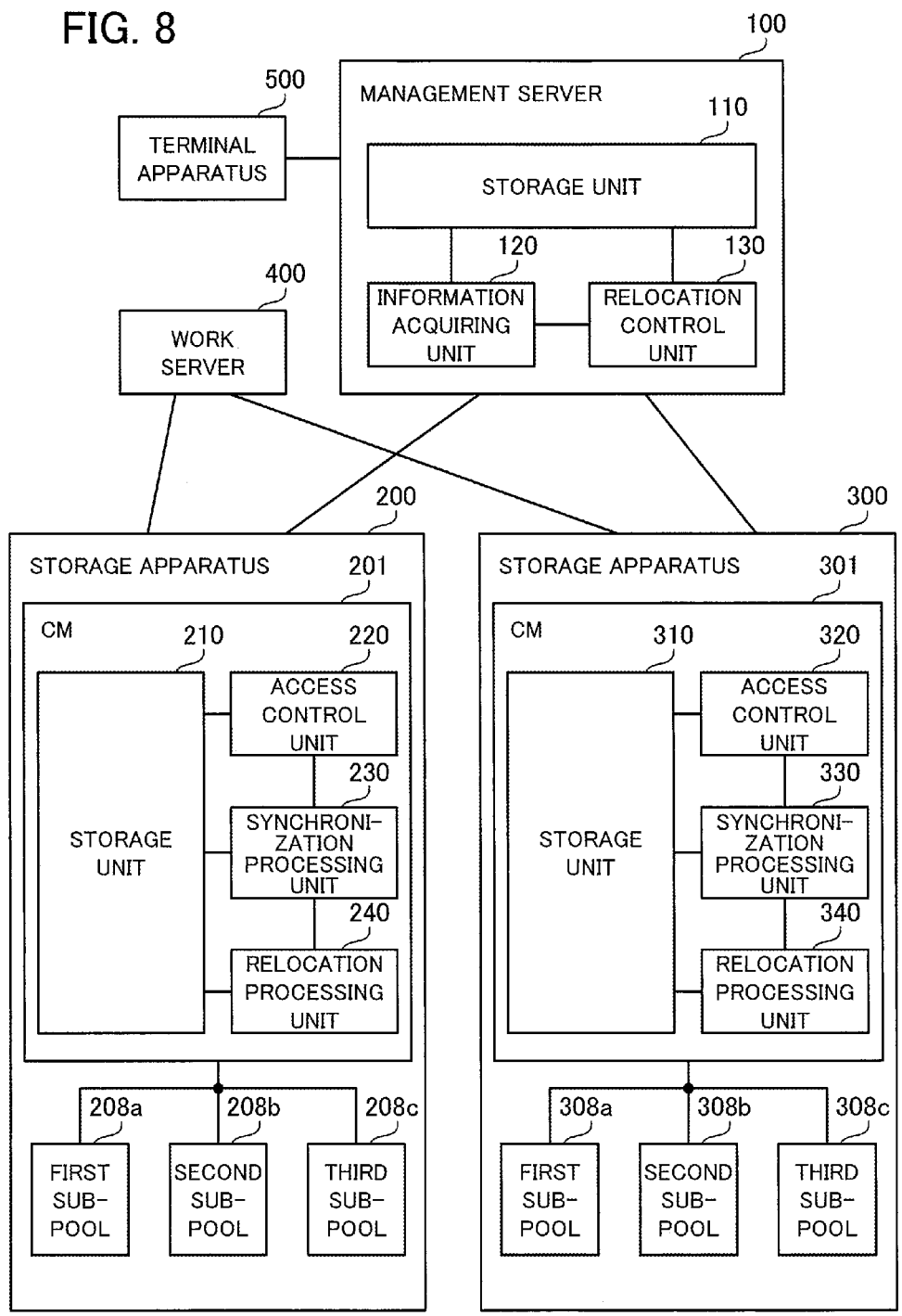
FIG. 8 depicts example functions of a storage system.

FIG. 8 depicts example functions of the storage system. The management server 100 includes a storage unit 110, an information acquiring unit 120 and a relocation control unit 130. As examples, the storage unit 110 is implemented as a storage region reserved in the RAM 102 or the HDD 103 and the information acquiring unit 120 and the relocation control unit 130 are implemented as program modules executed by the processor 101.

The storage unit 110 stores a group management table and an assignment management table. The group management table is information indicating that a primary storage apparatus and a secondary storage apparatus belong to the same group. For example, by using the group management table, it is possible, when an active storage apparatus has broken down, to determine which storage apparatus is to become active. The group management table 111 also stores information such as information on virtual volumes that are set in the respective storage apparatuses and are to be synchronized between the storage apparatuses.

The assignment management table is generated for each virtual volume. The assignment management table stores the correspondence between the respective divided regions of the virtual volume and the sub-pools. The assignment management table also stores IOPS information for each divided region.

The information acquiring unit 120 acquires IOPS information for each divided region in the virtual volume from the active storage apparatus out of the storage apparatuses 200 and 300. As one example, the IOPS information is acquired as a list of IOPS measured for each divided region.

The relocation control unit 130 determines whether data in the divided regions of the virtual volumes of the respective storage apparatuses 200 and 300 is to be relocated based on the IOPS information acquired from the information acquiring unit 120 and the assignment management table. On determining that data is to be relocated, the relocation control unit 130 generates a relocation list indicating which divided regions are to be reassigned to which sub-pools. The relocation control unit 130 transmits the generated relocation list to the corresponding storage apparatus and instructs the storage apparatus to relocate the corresponding data.

The controller module 201 of the storage apparatus 200 includes a storage unit 210, an access control unit 220, a synchronization processing unit 230, and a relocation processing unit 240. As examples, the storage unit 210 is implemented as a storage region reserved in the RAM 204 or the SSD 205, and the access control unit 220, the synchronization processing unit 230, and the relocation processing unit 240 are implemented as program modules executed by the processor 203.

The storage unit 210 stores a sub-pool management table and a volume management table. Information for managing unused regions and used regions in a sub-pool is registered in the sub-pool management table. Information indicating the correspondence between the divided regions in a virtual volume and regions in the sub-pools assigned to the divided regions is registered in the volume management table. The storage unit 210 also includes IOPS information.

The access control unit 220 executes access control in accordance with an access request from the work server 400 to a virtual volume. For example, when the access control unit 220 receives an access request to data stored in one of the divided regions in a virtual volume, the access control unit 220 refers to the volume management table and specifies the storage region of the sub-pool storing the data. The access control unit 220 then accesses the data stored in the specified storage region.

Whenever an access request to a divided region is received from the work server 400, the access control unit 220 also updates the IOPS information corresponding to the divided region.

When the storage apparatus 200 is active, the synchronization processing unit 230 transmits data updated by the access control unit 220 in a virtual volume inside the storage apparatus 200 to the storage apparatus 300 and requests backing up of the data. By doing so, the virtual volume inside the storage apparatus 200 and the corresponding virtual volume in the storage apparatus 300 are synchronized. When the storage apparatus 200 is on standby, the synchronization processing unit 230 writes updated data transmitted from the storage apparatus 300 into the corresponding virtual volume in the storage apparatus 200.

The relocation processing unit 240 relocates data by changing the sub-pool assigned to a divided region of the virtual volume in accordance with an instruction from the relocation control unit 130 of the management server 100. When data is relocated, data stored in the sub-pool before reassignment is moved to an empty region inside the sub-pool after reassignment.

The controller module 301 of the storage apparatus 300 includes a storage unit 310, an access control unit 320, a synchronization processing unit 330, and a relocation processing unit 340. As examples, the storage unit 310 is implemented as a storage region reserved in a RAM or a flash memory of the controller module 301, and the access control unit 320, the synchronization processing unit 330, and the relocation processing unit 340 are implemented as program modules executed by the processor of the controller module 301.

The storage unit 310 stores tables of the same configuration as the sub-pool management table and the volume management table stored in the storage unit 210. The access control unit 320, the synchronization processing unit 330, and the relocation processing unit 340 execute the same processing as the access control unit 220, the synchronization processing unit 230, and the relocation processing unit 240 of the storage apparatus 200.

Figure 9:
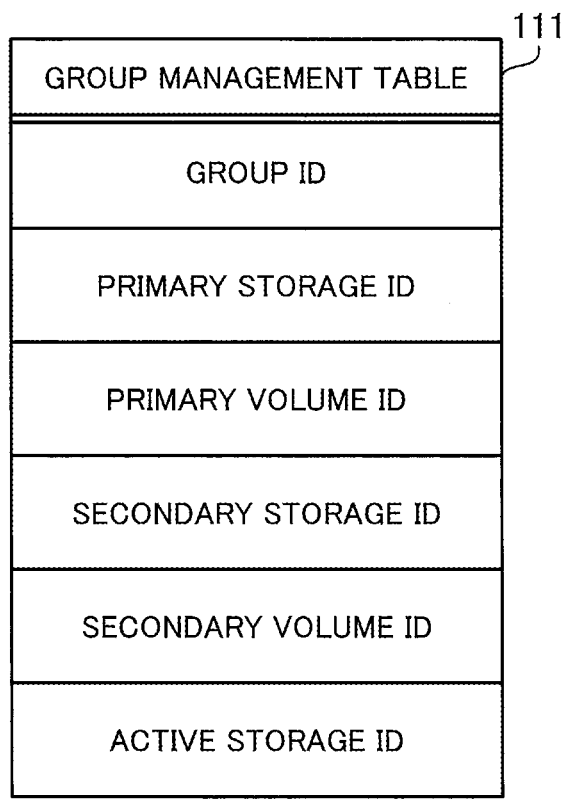
FIG. 9 depicts an example of a group management table.

FIG. 9 depicts an example of the group management table. The group management table 111 is stored in the storage unit 110 of the management server 100. The group management table 111 includes group ID, primary storage ID, primary volume ID, secondary storage ID, secondary volume ID, and active storage ID fields.

Information identifying a group is registered in the group ID field. Identification information of the primary storage apparatus 200, out of the redundant storage apparatuses is registered in the primary storage ID field. Identification information of the virtual volume 209 defined in the primary storage apparatus 200 is registered in the primary volume ID field.

Identification information of the secondary storage apparatus 300, out of the redundant storage apparatuses is registered in the secondary storage ID field. Identification information of the virtual volume 309 defined in the secondary storage apparatus 300 is registered in the secondary storage ID field. Identification information of the storage apparatus that is active out of the primary storage apparatus 200 and the secondary storage apparatus 300 is registered in the active storage ID field.

By registering identification information of the primary and secondary storage apparatuses in the group management table 111, it is possible for the management server 100 to identify the respective storage apparatuses that are redundantly provided. By registering the primary storage ID in the group management table 111, it is possible for the management server 100 to identify which storage apparatus is in the active state or standby state and to access one of the storage apparatuses. In addition, by registering the primary volume ID and the secondary volume ID in the group management table 111, it is possible for the management server 100 to identify a pair of virtual volumes to be synchronized with each other.

Figure 10:
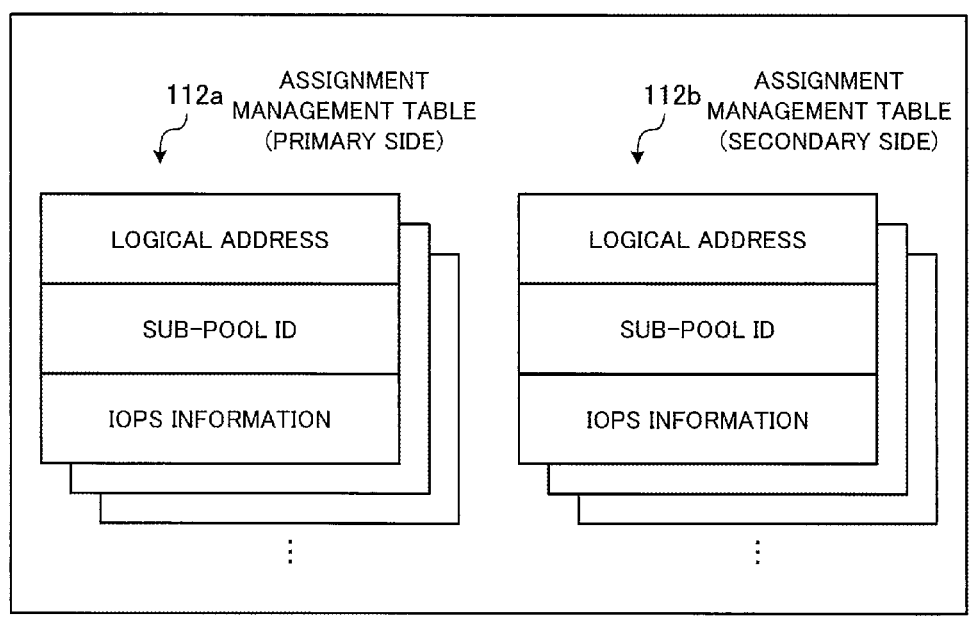
FIG. 10 depicts one example of an assignment management table.

FIG. 10 depicts one example of an assignment management table. As depicted in FIG. 10, an assignment management table 112a for the primary storage apparatus 200 and an assignment management table 112b for the secondary storage apparatus 300 are stored in the storage unit 110 of the management server 100.

In the assignment management table 112a, a record is generated for each divided region in which data is stored, out of the divided regions of the virtual volume 209 defined in the primary storage apparatus 200. Each record includes logical address, sub-pool ID, and IOPS information fields. The first logical address of a divided region in the virtual volume 209 is registered in the logical address field. Information identifying the sub-pool assigned to the divided region is registered in the sub-pool ID field. The value of the IOPS for the data stored in the divided region is registered in the IOPS information field.

The assignment management table 112b has the same data configuration as the assignment management table 112a. That is, a record for each divided region in which data is stored, out of the divided regions of the virtual volume 309 defined in the secondary storage apparatus 300, is generated in the assignment management table 112b. Each record includes logical address, sub-pool ID, and IOPS information fields. The first logical address of a divided region in the virtual volume 309 is registered in the logical address field. Information identifying the sub-pool assigned to the divided region is registered in the sub-pool ID field. The value of the IOPS for the data stored in the divided region is registered in the IOPS information field.

The information acquiring unit 120 acquires the IOPS measured for the data stored in each divided region from the active storage apparatus out of the storage apparatuses 200 and 300 and registers the IOPS in the IOPS information field of each record of the assignment management table corresponding to the storage apparatus. The relocation control unit 130 determines whether data in the virtual volume defined in the active storage apparatus is to be relocated based on the IOPS information of the assignment management table corresponding to the active storage apparatus.

The information acquiring unit 120 also registers the IOPS acquired from the active storage apparatus in the IOPS information field of each record of the assignment management table corresponding to the standby storage apparatus. That is, the information acquiring unit 120 replaces the IOPS registered in the assignment management table corresponding to the standby storage apparatus with the IOPS measured at the active storage apparatus.

The relocation control unit 130 determines whether data is to be relocated in the virtual volume defined in the standby storage apparatus based on the IOPS information of the assignment management table corresponding to the standby storage apparatus. By doing so, data is relocated in the standby storage apparatus based on the IOPS replaced by the above procedure. This means that in the same way as the data in the virtual volume in the active storage apparatus, the data in the virtual volume in the standby storage apparatus is placed in appropriate sub-pools in accordance with the access frequency from the work server 400. If the sub-pools on the same level in the storage apparatuses 200 and 300 have the same capacity, the same data stored in the virtual volumes is placed in sub-pools on the same level in the storage apparatuses 200 and 300.

Note that although the IOPS of each divided region in a virtual volume is managed in the assignment management table in the example in FIG. 10, it is also possible for example to manage the IOPS of each divided region as information that is separate to the assignment management table.

As one example, the records in the assignment management tables 112a and 112b are generated by the procedure described below.

The records in the assignment management table corresponding to the active storage apparatus are generated based on the IOPS information acquired from the active storage apparatus, for example. As one example, when the IOPS list is acquired by the management server 100, an IOPS list in which an IOPS is associated with identification information of each divided region in the virtual volume in the active storage apparatus is transmitted from the active storage apparatus to the management server. In this IOPS list, IOPS are registered only for divided regions in which data is stored.

This means that when new data has been written into an unused divided region in a virtual volume, for example, the information acquiring unit 120 is capable of identifying that new data has been written in the divided region by recognizing in the IOPS list that an IOPS has been newly registered for the divided region in which the new data has been written. At this time, the information acquiring unit 120 generates a record corresponding to the divided region in which the new data has been written in the corresponding assignment management table and registers the first logical address and the IOPS of the divided region in the generated record. As one example, "NULL" is registered in the sub-pool ID field of the generated record. When the sub-pool to which the divided region is assigned is subsequently decided by the relocation control unit 130, identification information of the sub-pool is registered in the sub-pool ID field.

As one example, when a record has been added to the assignment management table corresponding to the active storage apparatus, a record with the same content as the added record may be added to the assignment management table corresponding to the standby storage apparatus. Alternatively, the information acquiring unit 120 may acquire the IOPS information from the standby storage apparatus also. In such IOPS information, some values (for example, values decided in advance) are associated in advance with only divided regions in which data is stored. This makes it possible for the information acquiring unit 120 to also add records to the assignment management table corresponding to the standby storage apparatus using a similar procedure to the assignment management table corresponding to the active storage apparatus.

Figure 11:
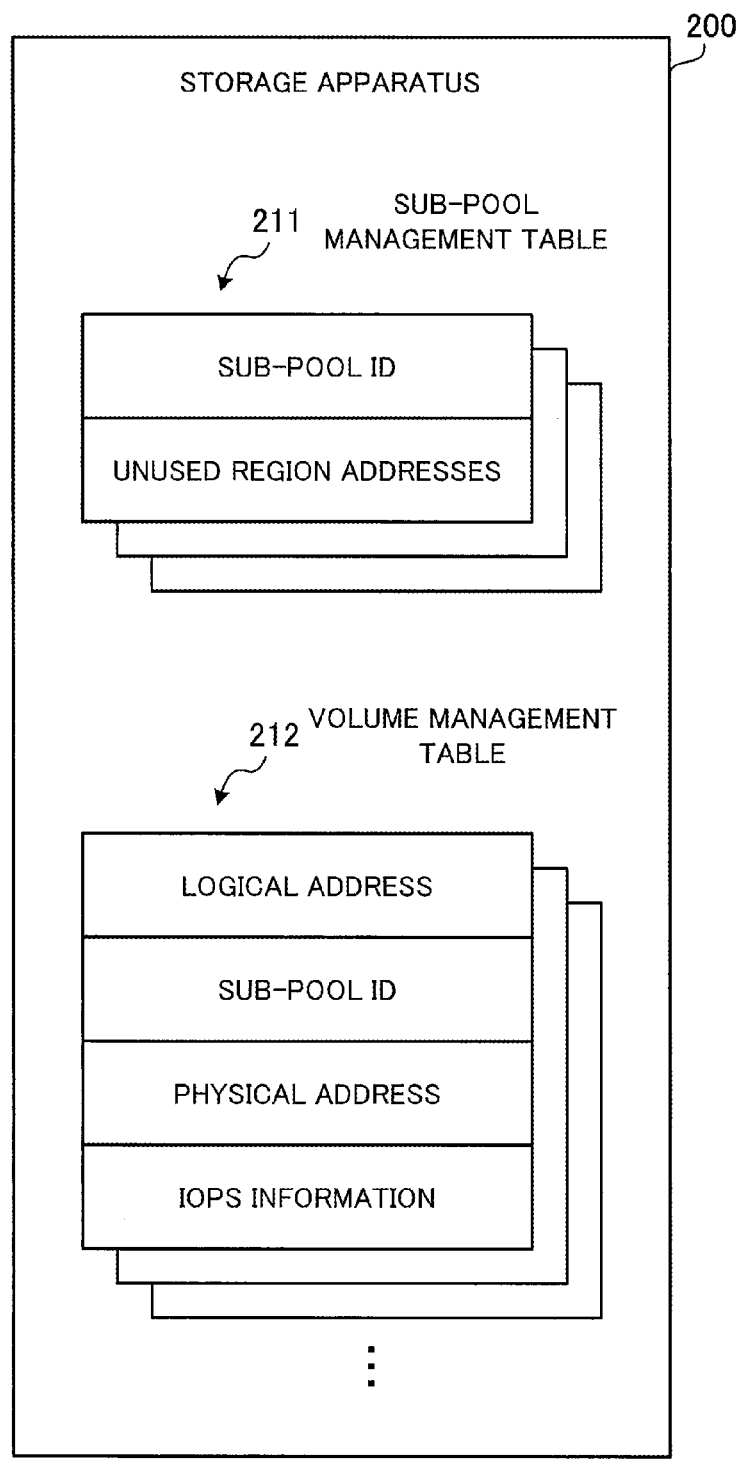
FIG. 11 depicts example information stored in a primary storage apparatus.

FIG. 11 depicts example information stored in the primary storage apparatus. A sub-pool management table 211 and a volume management table 212 are stored in the storage unit 210 of the storage apparatus 200.

The sub-pool management table 211 includes a record for each sub-pool. Each record includes sub-pool ID and unused region addresses fields. Information for identifying a sub-pool set in the storage apparatus 200 is registered in the sub-pool ID field. Information indicating the physical addresses of regions, out of the regions of the corresponding sub-pool, which have not been assigned to a divided region of a virtual volume are registered in the unused region addresses field.

The volume management table 212 includes a record for each divided region of the virtual volume 209 defined in the storage apparatus 200. Each record includes logical address, sub-pool ID, physical address, and IOPS information fields. The first logical address of the divided region in the virtual volume 209 is registered in the logical address field. The identification information of the sub-pool assigned to the divided region is registered in the sub-pool ID field. A physical address indicating location information in the sub-pool to which the divided region is assigned is registered in the physical address field. The value of the IOPS measured for the data stored in the divided region is registered in the IOPS information field.

When an access request to the virtual volume 209 is received from the work server 400, the access control unit 220 of the storage apparatus 200 refers to the volume management table 212. As one example, when access to a divided region in which data has already been stored in the virtual volume 209 is received, the access control unit 220 specifies, from the volume management table 212, the record in which the logical address of the divided region being accessed is stored. The access control unit 220 accesses data using the sub-pool ID and the physical address registered in the specified record.

On the other hand, when a write request for writing data in an unused divided region in the virtual volume 209 is received, the access control unit 220 specifies, from the volume management table 212, the record in which the logical address of the divided region that is the write destination is stored. On determining that a sub-pool ID and a physical address have not been registered in the specified record, the access control unit 220 refers to a record in the sub-pool management table 211. As examples, the record that is referred to may be a record corresponding to a sub-pool that is decided in advance or may be a record corresponding to the sub-pool with the largest unused region.

The access control unit 220 selects an unused region from the corresponding sub-pool based on the registered content of the unused region addresses in the record that is referred to. The access control unit 220 registers the location information of the region selected from the sub-pool in the sub-pool ID and physical address fields of the record specified from the volume management table 212 and updates the registered content of the unused region addresses so that the selected region is excluded. The access control unit 220 then stores the write data received from the work server 400 in the region selected from the sub-pool.

Note that when the IOPS for the corresponding divided region has been measured by the access control unit 220 at predetermined timing following registration of information in the sub-pool ID and physical address fields, the measured value of IOPS is registered in the IOPS information field. After this, the IOPS for the divided region is measured at fixed intervals by the access control unit 220, with the registered value in the IOPS information field being updated each time using the latest measured value.

Figure 12:
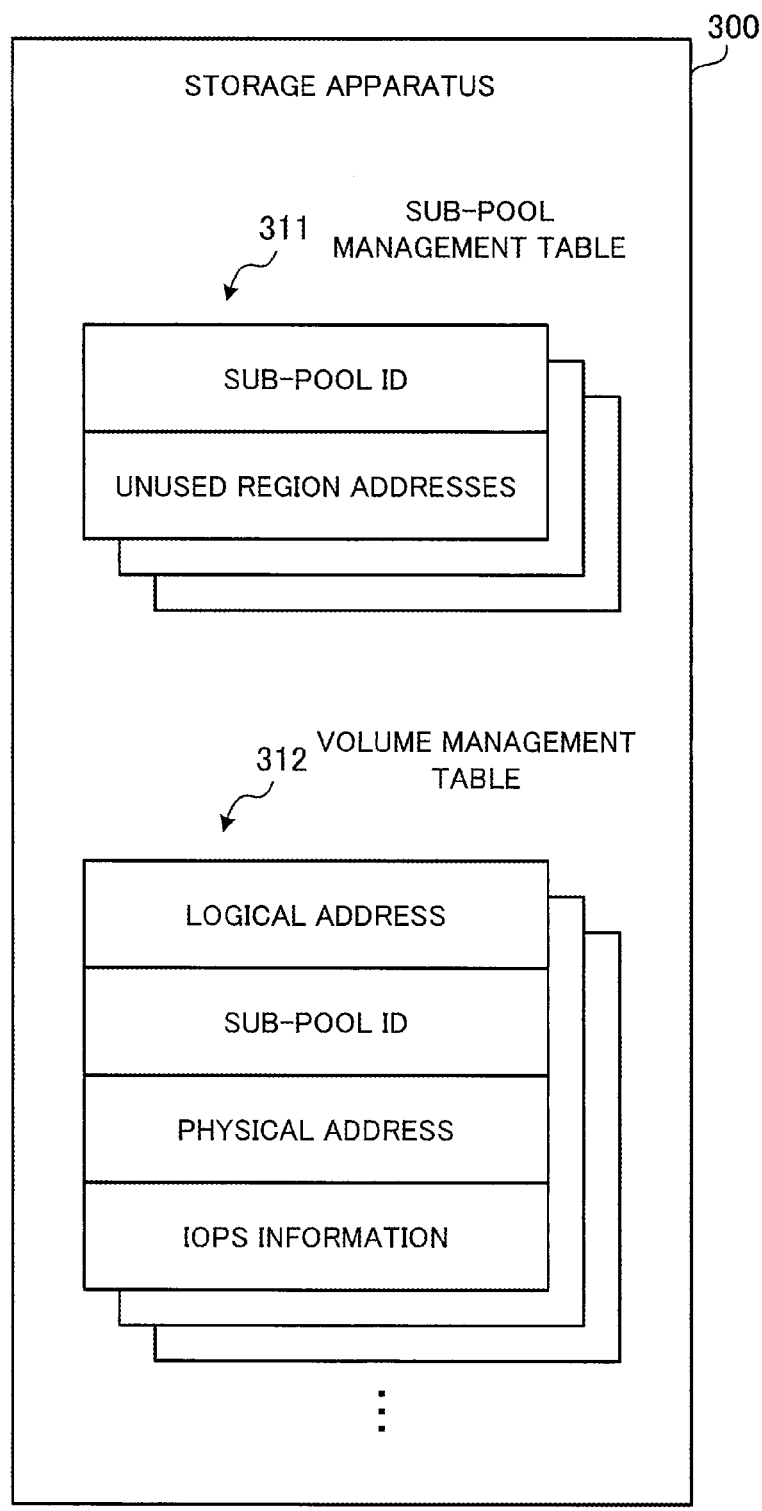
FIG. 12 depicts example information stored in a secondary storage apparatus.

FIG. 12 depicts example information stored in the secondary storage apparatus. A sub-pool management table 311 and a volume management table 312 are stored in the storage unit 310 of the secondary storage apparatus 300.

The sub-pool management table 311 is a table used to manage unused regions in each sub-pool set in the storage apparatus 300 and has the same data configuration as the sub-pool management table 211 depicted in FIG. 11. The volume management table 312 is a table for managing the assignment of the regions in the sub-pool to the divided regions of the virtual volume 309 defined in the storage apparatus 300, and has the same data configuration as the volume management table 212 depicted in FIG. 11.

Figure 13:
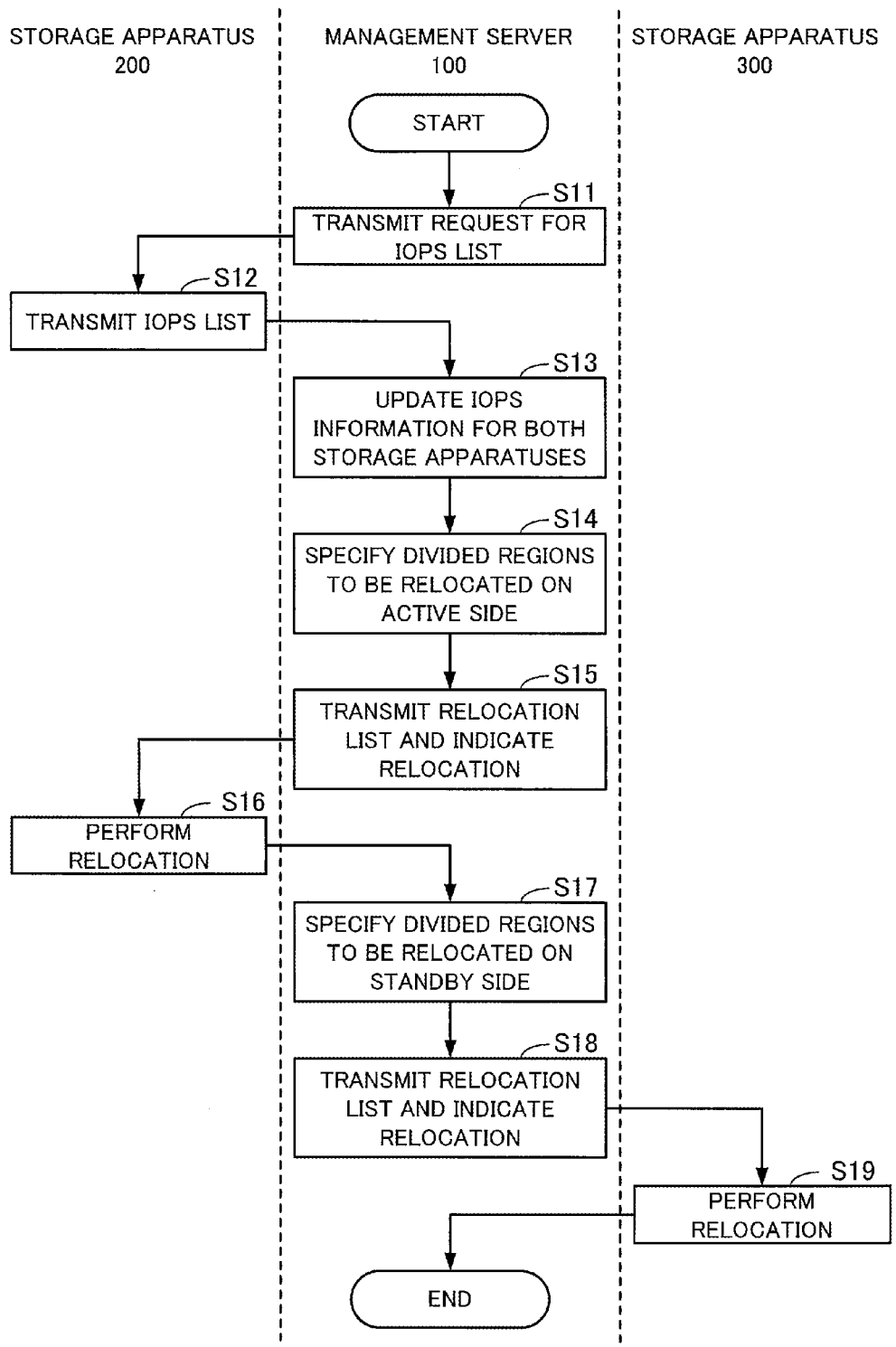
FIG. 13 is a flowchart depicting an example of a relocation process.

Next, the process that relocates data in accordance with access frequency will be described by way of a flowchart. FIG. 13 is a flowchart depicting an example of the relocation process. The process depicted in FIG. 13 is described below in order of the step numbers. Note that as one example, the following description assumes that the storage apparatus 200 is active and the storage apparatus 300 is on standby.

(S11) The information acquiring unit 120 of the management server 100 transmits a transmission request for the IOPS list to the active storage apparatus 200. Note that step S11 is executed by the information acquiring unit 120 at predetermined intervals. As one example, the predetermined intervals are 30 minute intervals.

(S12) The access control unit 220 of the storage apparatus 200 generates an IOPS list from the IOPS information for each divided region registered in the volume management table 212 and transmits the generated IOPS list to the management server 100. In the IOPS list, the first logical addresses of divided regions in which data is stored are associated with IOPS values.

(S13) The information acquiring unit 120 of the management server 100 overwrites the IOPS values for each divided region registered in the received IOPS list into the corresponding IOPS information field of the assignment management table 112a for the active storage apparatus 200. The information acquiring unit 120 also overwrites the IOPS values for each divided region registered in the received IOPS list into the corresponding IOPS information field of the assignment management table 112b for the standby storage apparatus 300.

(S14) The relocation control unit 130 of the management server 100 specifies divided regions to be relocated (i.e., divided regions whose data is to be relocated) in the virtual volume 209 in the active storage apparatus 200. The relocation control unit 130 then generates a relocation list for the storage apparatus 200 in which the specified divided regions are associated with sub-pools to be newly assigned to the divided regions.

For example, based on the assignment management table 112a, the relocation control unit 130 sorts the divided regions of the virtual volume 209 into descending order of the IOPS value. Next, the relocation control unit 130 classifies the sorted divided regions into divided regions where the IOPS value is equal to or above a threshold Th1, divided regions where the IOPS value is equal to or above a threshold Th2 but is below the threshold Th1, and divided regions where the IOPS value is below the threshold Th2 (where Th1>Th2).

Next, the relocation control unit 130 specifies divided regions presently assigned to the second sub-pool 208b or the third sub-pool 208c out of the divided regions where the IOPS value is equal to or above the threshold Th1. The relocation control unit 130 associates the first logical addresses of the specified divided regions and the identification information of the first sub-pool 208a, and registers such information in the relocation list for the storage apparatus 200.

The relocation control unit 130 specifies divided regions presently assigned to the first sub-pool 208a or the third sub-pool 208c out of the divided regions where the IOPS value is equal to or above the threshold Th2 but below the threshold Th1. The relocation control unit 130 associates the first logical addresses of the specified divided regions and the identification information of the second sub-pool 208b and registers such information in the relocation list for the storage apparatus 200.

In addition, the relocation control unit 130 specifies divided regions presently assigned to the first sub-pool 208a or the second sub-pool 208b out of the divided regions where the IOPS value is below the threshold Th2. The relocation control unit 130 associates the first logical addresses of the specified divided regions and the identification information of the third sub-pool 208c and registers such information in the relocation list for the storage apparatus 200. As a result of the above procedure, the relocation list for the storage apparatus 200 is generated.

Note that when the thresholds Th1 and Th2 have not been set, the relocation list is generated as described below, for example. Based on the assignment management table 112a, the relocation control unit 130 sorts the divided regions of the virtual volume 209 into descending order of the IOPS value. Next, the relocation control unit 130 acquires the free capacity of the first sub-pool 208a and determines the number of divided regions that can be assigned to the first sub-pool 208a. The relocation control unit 130 specifies the determined number of divided regions from the start of the sorted divided regions as divided regions to be assigned to the first sub-pool 208a. Out of the specified divided regions, the relocation control unit 130 registers the first logical addresses of divided regions that are presently assigned to sub-pools aside from the first sub-pool 208a in the relocation list so as to be associated with the identification information of the first sub-pool 208a. In the same way for the second sub-pool 208b and the third sub-pool 208c, the relocation control unit 130 specifies the divided regions to be relocated from the remaining divided regions based on the free capacity of the respective sub-pools and registers divided regions to be relocated in the relocation list.

(S15) The relocation control unit 130 transmits the relocation list generated in step S14 to the storage apparatus 200 and instructs the storage apparatus 200 to perform relocation.

(S16) The relocation processing unit 240 of the storage apparatus 200 performs relocation based on the received relocation list.

For example, when instructed to assign a divided region that is presently assigned to the second sub-pool 208b to the first sub-pool 208a, the relocation processing unit 240 refers to a record corresponding to the first sub-pool 208a in the sub-pool management table 211. Based on the unused region addresses in the referred-to record, the relocation processing unit 240 selects an unused region from the first sub-pool 208a and updates the content of the unused region addresses of the referred-to record to exclude the selected unused region. The relocation processing unit 240 reads out the data of the divided region indicated for relocation from the second sub-pool 208b and stores the data in the unused region selected from the first sub-pool 208a. Out of the records in the volume management table 212, the relocation processing unit 240 rewrites the sub-pool ID of the records corresponding to the divided regions indicated for relocation with an ID indicating the first sub-pool 208a.

When the relocation of data has been completed for every divided region registered in the received relocation list, the relocation processing unit 240 notifies the management server 100 that relocation is complete. On receiving notification that relocation is complete, the relocation control unit 130 of the management server 100 rewrites the sub-pool IDs of records, out of the records in the assignment management table 112b, which correspond to the divided regions registered in the relocation list using the newly assigned sub-pool IDs registered in the relocation list.

Note that in step S14, when no divided regions are registered in the relocation list, steps S15 and S16 are skipped.

(S17) The relocation control unit 130 specifies divided regions to be relocated in the virtual volume 309 of the standby storage apparatus 300. The relocation control unit 130 generates a relocation list for the storage apparatus 300 in which the specified divided regions are associated with sub-pools to be newly assigned to the divided regions. In this step S17, the same processing as step S14 is executed based on the assignment management table 112b. Note that it is possible to use the thresholds Th1, Th2 described above as the thresholds for determining the sub-pools to be assigned.

(S18) The relocation control unit 130 transmits the relocation list generated in step S17 to the storage apparatus 300 and instructs the storage apparatus 300 to perform relocation.

(S19) The relocation processing unit 340 of the storage apparatus 300 performs relocation based on the received relocation list. In step S19, the same processing as step S16 is performed based on the sub-pool management table 311 and the volume management table 312.

When the relocation of data has been completed for every divided region registered in the received relocation list, the relocation processing unit 340 notifies the management server 100 that relocation is complete. On receiving notification that relocation is complete, the relocation control unit 130 of the management server 100 rewrites the sub-pool IDs of records, out of the records in the assignment management table 112b, which correspond to the divided regions registered in the relocation list using the newly assigned sub-pool IDs registered in the relocation list. The processing then ends.

Note that in step S17, when no divided regions are registered in the relocation list, steps S18 and S19 are skipped.

When the thresholds Th1 and Th2 have been set, in the processing in FIG. 13, step S17 may be skipped and in step S18, the relocation list generated in step S14 may be transmitted to the storage apparatus 300.

Although relocation is performed for the storage apparatus 300 after relocation has been performed for the storage apparatus 200 in the processing in FIG. 13, it is also possible to perform relocation for the storage apparatus 200 after relocation has been performed for the storage apparatus 300.

According to the processing in FIG. 13 described above, data is relocated for the virtual volume 209 of the storage apparatus 200 based on the IOPS values measured at the active storage apparatus 200. Data is also relocated for the virtual volume 309 of the standby storage apparatus 300 based on the same IOPS values. By doing so, data included in the virtual volume 309 is placed in sub-pools on an appropriate level in accordance with the access frequency of corresponding data in the virtual volume 209. Accordingly, when a failover occurs and the access control unit 320 of the storage apparatus 300 starts to receive access requests to the virtual volume 309 from the work server 400, it is possible to avoid a drop in response speed to the access requests compared to before the failover.

Third Embodiment

Figure 14:
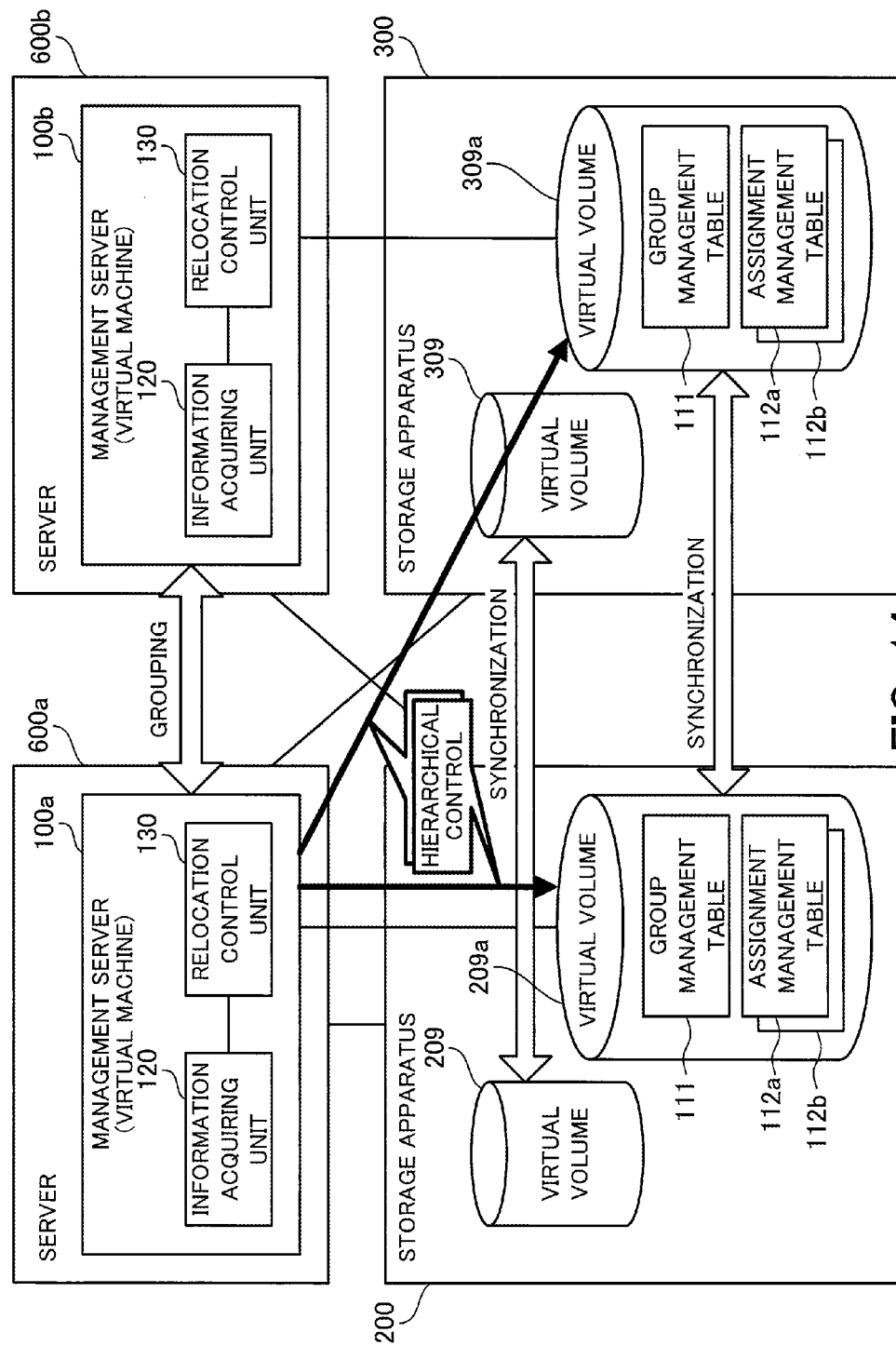
FIG. 14 depicts an example configuration of a storage system according to a third embodiment.

FIG. 14 depicts an example configuration of a storage system according to a third embodiment. In FIG. 14, component elements that are the same as the second embodiment have been assigned the same reference numerals and description thereof is omitted.

The storage system according to the second embodiment includes a single management server 100. This means that when the management server 100 breaks down, the relocation process for data in the storage apparatuses 200 and 300 stops being performed. In the third embodiment, the processing of the management server 100 is executed by a virtual machine and the virtual machine is redundantly provided so that a failover can be performed when the active virtual machine has stopped.

As depicted in FIG. 14, the storage system in the third embodiment includes servers 600a and 600b in place of the management server 100. The servers 600a and 600b are connected via the network 900, (for example, a LAN) not illustrated, to the storage apparatuses 200 and 300.

At the server 600a, a management server 100a that executes the same processing as the management server 100 operates as a virtual machine. At the server 600b also, a management server 100b that executes the same processing as the management server 100 operates as a virtual machine. The management servers 100a and 100b are grouped (clustered) as redundant virtual machines. In this arrangement, one of the management servers 100a and 100b is active and the other is on standby. When the management server 100a is active, the processing of the information acquiring unit 120 and the relocation control unit 130 is executed in the management server 100a. Similarly, when the management server 100b is active, the processing of the information acquiring unit 120 and the relocation control unit 130 is executed in the management server 100b. When the active management server has stopped operating, the standby management server becomes active and the processing of the information acquiring unit 120 and the relocation control unit 130 continues.

The real storage region of a virtual disk provided in the management server 100a is realized by the storage apparatus 200. In the storage apparatus 200, a virtual volume 209a is set corresponding to the virtual disk of the management server 100a. As examples, the group management table 111 and the assignment management tables 112a and 112b are stored in the virtual volume 209a and are referred to by the management server 100a.

In the same way, the real storage region of a virtual disk provided in the management server 100b is realized by the storage apparatus 300. In the storage apparatus 300, a virtual volume 309a is set corresponding to the virtual disk of the management server 100b. As examples, the group management table 111 and the assignment management tables 112a and 112b are stored in the virtual volume 309a and are referred to by the management server 100b.

The virtual volume 209a and the virtual volume 309a are synchronized. In the same way as the virtual volumes 209 and 309, the storage regions of the virtual volumes 209a and 309a are subjected to hierarchical control by the active management server out of the management servers 100a and 100b.

As one example, when the management server 100a is active, whenever the virtual volume 209a of the storage apparatus 200 is updated, the updated content is immediately reflected in the virtual volume 309a. As a result, the group management table 111 and the assignment management table 111a and 112b with the same registered content are stored in the virtual volume 209a and the virtual volume 309a.

The information acquiring unit 120 of the management server 100a acquires, from the storage apparatus 200, the measured values of IOPS for the respective divided regions of the virtual volume 209a for accesses from the management server 100a. The relocation control unit 130 of the management server 100a optimizes the assignment of sub-pools to the respective divided regions of the virtual volume 209a based on the acquired IOPS values. Together with this, the relocation control unit 130 of the management server 100a optimizes the assignment of sub-pools to the respective divided regions of the virtual volume 309a based on the acquired IOPS values.

Here, when a failover occurs and the management server 100b becomes active, the management server 100b continues the processing while referring to the group management table 111 and the assignment management table 112b in the virtual volume 309a. As described above, the sub-pools to which the divided regions of the virtual volume 309a have been assigned are optimized in accordance with IOPS. This means that the response speed for access requests from the management server 100b to the virtual volume 309a is kept at a similar speed to the response speed for access requests from the management server 100a to the virtual volume 209a before the failover occurred. Accordingly, the processing speed of the management server 100b after the failover is kept at a similar processing speed to the management server 100a before the failover.

When the management server 100b has become active, the group management table 111 and the assignment management table 112b inside the virtual volume 309a, which have been synchronized with the corresponding tables inside the virtual volume 209a, are referred to from the management server 100b. In this way, it is possible for the management server 100b to continue the processing of the management server 100a before the failover without a drop in access performance to the tables described above.

Note that the processing functions of the apparatuses in the embodiments described above (as examples, the storage management apparatus 1, the management server 100, the controller modules 201 and 301, the work server 400, and the servers 600a and 600b) can be realized by computers. By providing programs in which the processing content of the functions of the respective apparatuses is written and having such programs executed by computers, the processing functions described above are realized by computers. Programs in which the appropriate processing content is written can be recorded on a computer-readable storage medium. A magnetic storage apparatus, an optical disc, a magneto-optical recording medium, and a semiconductor memory can be given as examples of a computer-readable storage medium. The magnetic storage apparatus may be a hard disk drive, a flexible disk, or a magnetic tape. DVD, DVD-RAM, CD-ROM, CD-R, and CD-RW are all examples of optical discs. An MO disc is one example of a magneto-optical recording medium.

When programs are distributed, as one example portable recording media such as DVDs or CD-ROMs on which the programs are recorded may be sold. It is also possible to store programs in a storage apparatus of a server computer and to transfer the programs from the server computer to other computers via a network.

A computer that executes a program may store a program that has been recorded on a portable recording medium or a program transferred from a server computer in its own storage apparatus, for example. The computer then reads out the program from its own storage apparatus and executes processing according to the program. Note that it is also possible for a computer to read the program directly from a portable recording medium and execute processing according to the program. It is also possible for a computer to sequentially execute processing according to a program whenever a program is transferred from a server computer connected via a network.

Note that the embodiments described above can be implemented in combination as appropriate.

With the above embodiments, it is possible to avoid a drop in the speed of access processing when operation is switched.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
   a first control apparatus that accesses a first storage apparatus in accordance with an access request from a host apparatus, the first storage apparatus including a plurality of first storage regions which have different access performance;
   a second control apparatus that:
      receives data blocks stored in the first storage apparatus from the first control apparatus via a first communication path and backs up the received data blocks to a second storage apparatus, the second storage apparatus including a plurality of second storage regions which have different access performance; and
      receives an access request from the host apparatus instead of the first control apparatus and accesses the second storage apparatus in accordance with the received access request when an operation of the first control apparatus stops; and
   a storage management apparatus that:
      acquires frequency information from the first control apparatus via a second communication path, the frequency information indicating frequencies of access from the host apparatus to respective ones of a plurality of first data blocks stored in the first storage apparatus;
      executes a first deciding process that decides, based on the frequency information in response to acquiring of the frequency information, in which of the plurality of first storage regions the plurality of first data blocks are each to be placed;
      transmits first instruction information to the first control apparatus via the second communication path in response to completion of the first deciding process, the first instruction information indicating that the plurality of first data blocks are to be placed in corresponding ones of the plurality of first storage regions decided by the first deciding process;
      executes a second deciding process that decides, based on the frequency information in response to the acquiring of the frequency information, in which of the plurality of second storage regions a plurality of second data blocks are each to be placed, the plurality of second data blocks being a plurality of backup data blocks respectively corresponding to the plurality of first data blocks; and
      transmits second instruction information to the second control apparatus via the second communication path in response to completion of the second deciding process, the second instruction information indicating that the plurality of second data blocks are to be placed in corresponding ones of the plurality of second storage regions decided by the second deciding process.

2. The storage system according to claim 1, wherein
   the first deciding process is executed based on respective free capacities of the plurality of first storage regions, and
   the second deciding process is executed based on respective free capacities of the plurality of the second storage regions.

3. A storage management method comprising:
   accessing, by a first control apparatus, a first storage apparatus in accordance with an access request from a host apparatus, the first storage apparatus including a plurality of first storage regions which have different access performance;
   receiving, by a second control apparatus, data blocks stored in the first storage apparatus from the first control apparatus via a first communication path and backing up the received data blocks to a second storage apparatus, the second storage apparatus including a plurality of second storage regions which have different access performance;
   receiving, by the second control apparatus, an access request from the host apparatus instead of the first control apparatus and accessing the second storage apparatus in accordance with the received access request when an operation of the first control apparatus stops;
   acquiring, by a storage management apparatus, frequency information from the first control apparatus via a second communication path, the frequency information indicating frequencies of access from the host apparatus to respective ones of a plurality of first data blocks stored in the first storage apparatus;
   executing, by the storage management apparatus, a first deciding process that decides, based on the frequency information in response to the acquiring of the frequency information, in which of the plurality of first storage regions the plurality of first data blocks are each to be placed;
   transmitting, by the storage management apparatus, first instruction information to the first control apparatus via the second communication path in response to completion of the first deciding process, the first instruction information indicating that the plurality of first data blocks are to be placed in corresponding ones of the plurality of first storage regions decided by the first deciding process;
   executing, by the storage management apparatus, second deciding process that decides, based on the frequency information in response to the acquiring of the frequency information, in which of the plurality of second storage regions a plurality of second data blocks are each to be placed, the plurality of second data blocks being a plurality of backup data blocks respectively corresponding to the plurality of first data blocks; and
   transmitting, by the storage management apparatus, second instruction information to the second control apparatus via the second communication path in response to completion of the second deciding process, the second instruction information indicating that the plurality of second data blocks are to be placed in corresponding ones of the plurality of second storage regions decided by the second deciding process.

\* \* \* \* \*